United States Patent Office 2,912,045
Patented Nov. 10, 1959

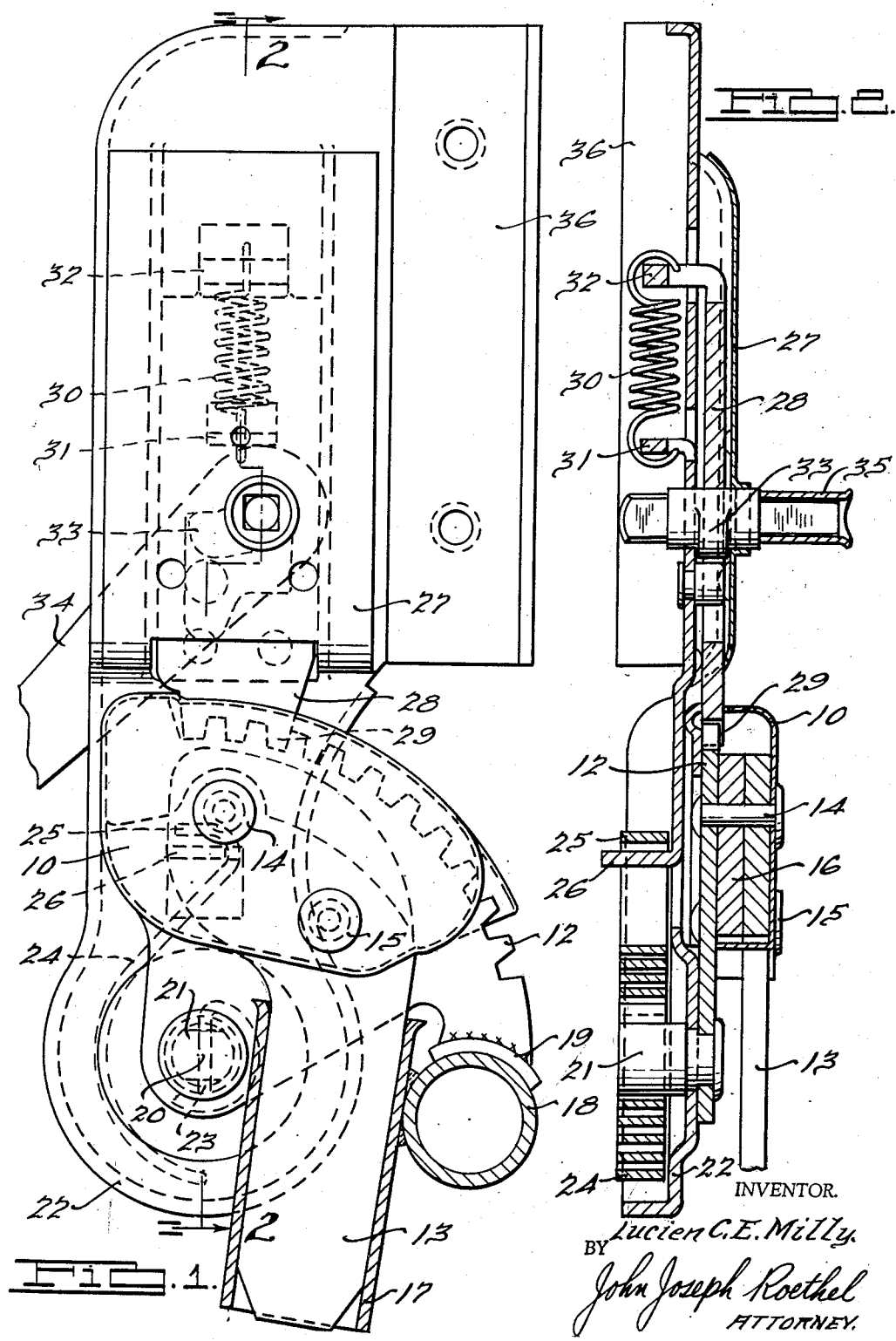

2,912,045

ADJUSTABLE BACKREST MECHANISM

Lucien Charles Eugène Milly, Paris, France

Application September 12, 1957, Serial No. 683,571

Claims priority, application France October 8, 1956

5 Claims. (Cl. 155—160)

This invention relates to a seat backrest mechanism which permits the backrest to be selectively positioned in an angular or tilted position, and which is particularly adapted for use in reclining seats in automobiles or other vehicles.

Devices for tilting and locking adjustable seat backrests relatively to the seats are already known in the prior art. One known form of such device comprises tiltable links connecting the seats and backrests, the links being used in pairs and fixed to the seat frame before the seat is upholstered. The application of this device is expensive and difficult because the assembly of the seat and backrest require special care and an excessive length of labor time. It might appear a simple matter to overcome the difficulty of upholstering the seat by fitting the links after the seat and back have been covered. But this procedure involves certain disadvantages, particularly in that the fitting of the links over the upholstery requires extreme care. Further, the use of exposed link means, the link means normally being of rather intricate design, would require that the finish machining of the parts be carefully done and that a suitable surface finish be applied. The cost of the careful machining and application of a surface finish would outweigh any saving derived from the lower cost of installation.

It is an object of the present invention to reduce the cost of reclining seat units by using especially constructed linkage mechanism for assembling the seat to the backrest mechanism, which linkage mechanism permits at low cost the casual removability of the link part which until now has been rigidly assembled to the seat. The foregoing is accomplished by the use of known means such, as lugs and socket members or the like. The seat device embodying the present invention is characterized by the ease of removability of the seat back relative to the seat, the inexpensiveness of the members used in its construction, and the concealment of the members by the upholstery, the latter being achieved while maintaining the cost of the upholstery operation at a low and economical level.

It is a further object of the present invention to provide a new and improved combination of means so as to produce a linkage mechanism characterized by its light weight and small size and yet being sturdy and entirely suitable for its purpose.

The new features and the advantages of the present invention will appear in the following description and appended claims, reference being had to the accompanying drawing forming a part of the specification and showing a non-limitative form of execution of the objects of the invention in which:

Fig. 1 is a front view in part sectional of a device to adjust the tilted position of the backrest of a motor vehicle seat according to the invention.

Fig. 2 is a sectional view taken substantially through line 2—2 of Fig. 1 looking in the direction of the arrows.

Referring to the drawing, there is illustrated a particular embodiment of the invention comprising a housing 10 containing a toothed gear sector 12. The housing 10 and gear sector 12 are secured to an elongated lug 13 by means of rivets 14 and 15. The gear sector 12 and lug 13 are separated by a shim 16 acting as a brace.

The end of the lug 13 is preferably of a truncated cone shape for an easy insertion into a socket member 17. The socket 17 is of a shape complementary to the lug 13 and is adapted to tightly hold the lug 13 when the latter is jammed therein. The socket member 17 is rigidly secured or welded, for example, to a member 18, preferably of tubular shape, which forms the rear part of a seat support or the rear side of a proper seat frame. The assembly of the lug 13 within the socket 17 may be stabilized by welding a foot member 19 on the gear sector 12, which foot member 19 is adapted to rest on the tubular member 18, see Fig. 1.

At its center 20 the gear sector 12 is provided with a shoulder stud or shaft 21, the latter being rigidly riveted to the gear sector for rotation therewith. The shoulder stud 21 journals a second housing 22 thereon, said housing 22 being freely swingable. The stud 21 is provided with a slot or kerf 23 receiving the inner end of a balance spring 24 of the flat wound spiral type. The free or outer end of the spring 25 is hooked over a lug 26 lanced out of the side wall of the housing or casing 22.

The upper portion of the housing or casing 22 has a further casing or housing 27 secured thereto. The casing 27 is provided with slideways guiding a slidable bolt 28 provided at its lower end with suitable teeth 29 adapted to engage the teeth of the gear sector 12. The bolt 28 is spring urged into sector engaging direction by a coil spring 30 secured at its lower end to a lug 31 lanced out of the casing or housing 22 and at its upper end to a lug 32 formed on the upper end of bolt 28.

The teeth 29 of the bolt 28 may be disengaged from the teeth of the sector 12 by operation of a rollback 33 operable through a handle or gripping device 34. The shaft of the rollback 33 may be synchronized with the operation of a similar mechanism arranged at the opposite side of the seat, the coupling link being preferably a tubular member 35.

The housing or casing 22 is provided with a bracket portion 36 by which it is adapted to be secured to the seat back by suitable bolts or the like. It will be readily apparent that the device embodied in the present invention, particularly because of the construction and arrangement whereby the lug 13 is fitted into the receiving socket 17, may be fitted by the bracket 36 on the seat back frame without any particular care. The upholstering of the seat back will conceal this assembly as well as most of the other parts of the mechanism. It will also be readily apparent that the seat back frame may be easily removed from the seat frame by withdrawing the lug 13 from the socket 17. This removal may be accomplished regardless of whether or not the seat and its back rest are upholstered.

The operation of the mechanism is relatively simple. If it is desired to tilt the seat back rest from the position of the mechanism shown in Fig. 1, it is only necessary to lift the lever arm 34 to rotate the rollback 33 in a clockwise direction as viewed in Fig. 1. It will be understood that the symmetric mechanism being coupled by the tubular member 35 will be correspondingly operated. The operation of the rollback 33 will cause the bolt teeth 29 to become disengaged from the teeth of the gear sector 12. After the teeth have been disengaged it is only necessary to exert slight pressure on the seat back to overcome the effect of the counterbalance springs 24 to tilt the backrest backwards. Upon the desired angular position being obtained, it is only necessary to release the lever 34 and the spring 20 will restore the bolt 28 to its normal sector engaging position.

If the seat backrest is in a tilted position and it is desired to restore it to its normal upright position, it is only necessary to raise the handle 34 to cause the rollback 33 to raise the bolt 28 and the counter-balance spring 24 will cause the backrest to rise. The backrest motion may be arrested at any desired position and release of the handle 34 will cause it to be locked in substantially such position.

I claim:

1. Seat backrest adjusting mechanism comprising a first casing means, a gear sector secured to said first casing means, an elongated member secured to said first casing means, a second casing means swingably mounted on said first casing means, sector engaging means carried on said second casing means, operating means for disengaging said sector engaging means from said gear sector to permit said second casing means to be tilted relative to said first casing means, means for securing said second casing means to a seat backrest frame, and socket means removably receiving said elongated member whereby said seat backrest and adjusting mechanism may be positioned in operative relation to a seat, said socket means being secured to a seat frame member, and seat member frame engaging means carried by said sector to stabilize said seat backrest and adjusting mechanism when positioned in said socket means.

2. Seat backrest adjusting mechanism comprising a first casing means, a gear sector secured to said first casing means, a second casing means swingably mounted on said first casing means, sector engaging means carried on said second casing means, operating means for disengaging said sector engaging means from said gear sector to permit said second casing means to be tilted relative to said first casing means, said second casing means being adapted to be rigidly secured to a seat backrest, said first casing means being provided with a socket engaging means adapted to be fitted within a socket carried on a seat frame whereby said backrest is removably and tiltably mounted relative to a seat structure, and stabilizing means carried by said sector engaging a part of said seat frame when said backrest adjusting mechanism is positioned in said socket.

3. Seat backrest adjusting mechanism comprising a first casing means, a gear sector secured to said first casing means, a second casing means swingably mounted on said first casing means, sector engaging means carried on said second casing means, operating means for disengaging said sector engaging means from said gear sector to permit said second casing means to be tilted relative to said first casing means, spring means effective to restore said sector engaging means into engagement with said gear sector after disengagement therefrom, said second casing means being adapted to be rigidly secured to a seat backrest, said first casing means being provided with a socket engaging means adapted to be fitted within a socket carried on a seat frame whereby said backrest is removably and tiltably mounted relative to a seat structure, and stabilizing means carried by said sector engaging a part of said seat frame when said backrest adjusting mechanism is positioned in said socket.

4. Seat backrest adjusting mechanism comprising a first casing means, a gear sector secured to said first casing means, a second casing means swingably mounted on said first casing means, sector engaging means carried on said second casing means, operating means for disengaging said sector engaging means from said gear sector to permit said second casing means to be tilted relative to said first casing means, counterbalance spring means interposed between said first and second casing means normally urging the same toward a predetermined relationship in which said backrest would be upright relative to its associated seat, said second casing means being adapted to be rigidly secured to a seat backrest, said first casing means being provided with a socket engaging means adapted to be fitted within a socket carried on a seat frame whereby said backrest is removably and tiltably mounted relative to a seat structure, and stabilizing means carried by said sector engaging a part of said seat frame when said backrest adjusting mechanism is positioned in said socket.

5. Seat backrest adjusting mechanism comprising a first casing means, a gear sector secured to said first casing means, a second casing means swingably mounted on said first casing means, sector engaging means carried on said second casing means, operating means for disengaging said sector engaging means from said gear sector to permit said second casing means to be tilted relative to said first casing means, spring means effective to restore said sector engaging means into engagement with said gear sector after disengagement therefrom, counterbalance spring means interposed between said first and second casing means normally urging the same toward a predetermined relationship in which said backrest would be upright relative to its associated seat, said second casing means being adapted to be rigidly secured to a seat backrest, said first casing means being provided with a socket engaging means adapted to be fitted within a socket carried on a seat frame whereby said backrest is removably and tiltably mounted relative to a seat structure, and stabilizing means carried by said sector engaging a part of said seat frame when said backrest adjusting mechanism is positioned in said socket.

References Cited in the file of this patent

UNITED STATES PATENTS

| | | |
|---|---|---|
| 1,929,471 | Bank | Oct. 10, 1933 |
| 2,040,942 | Katenkamp | May 19, 1936 |
| 2,445,362 | Nunes | July 20, 1948 |
| 2,784,770 | Herr | Mar. 12, 1957 |